United States Patent [19]

Straslicka

[11] 3,768,776
[45] Oct. 30, 1973

[54] STEAM TURBINE GOVERNOR VALVE ACTUATING MECHANISM

[75] Inventor: William A. Straslicka, Norvelt, Pa.

[73] Assignee: Carrier Corporation, Syracuse, N.Y.

[22] Filed: July 24, 1972

[21] Appl. No.: 274,159

[52] U.S. Cl. .................................. 251/231, 74/581
[51] Int. Cl. ............................................. F16k 31/44
[58] Field of Search .................... 251/213, 231, 233, 251/234, 236, 244; 74/581, 582, 586

[56] References Cited
UNITED STATES PATENTS

| | | | |
|---|---|---|---|
| 1,973,744 | 9/1934 | Brown................................. | 251/231 |
| 3,103,131 | 9/1963 | Banek................................. | 74/582 X |

Primary Examiner—Martin P. Schwadron
Assistant Examiner—D. Matthews
Attorney—J. Raymond Curtin

[57] ABSTRACT

The connecting links of the pinned pivotal joints in the turbine governor valve operating mechanism are maintained under tension by a stack of Belleville spring washers mounted in one motion transmitting member. The spring washers urge a ball against the other motion transmitting member establishing a preloaded joint between the valves and the valve actuating member. This arrangement eliminates play in the pinned joint resulting in a more stable governing system.

5 Claims, 3 Drawing Figures 3,768,776

STEAM TURBINE GOVERNOR VALVE ACTUATING MECHANISM

BACKGROUND OF THE INVENTION

In larger steam turbines, a plurality of poppet type valves are arranged in the valve chest to control the flow of steam to the turbine. The valves are movable in an axial direction into and out of engagement with the valve seats. Conventionally, the valves are connected to an operating arm movable in an arcuate path about a fixed axis. The actuating arm is operated by a servo motor controlled by the turbine governor.

The valves, and accordingly the mechanism connected thereto, are subjected to vibration of high frequency and of substantial magnitude.

The governor valve unbalanced forces are unpredictable from the moment the valve leaves its seat until reaching full open position. The reversal of these forces must be contained by the valve gear linkage operatively connecting the valves to the actuating arm. Universally, that linkage includes pinned joints. The components of these joints are produced with manufacturing tolerances with the result there is a clearance in every pinned joint and the reaction of the governor valve forces and these clearances, regardless of how slight they may be, results in an unstable governing system. Also, with vibration of such magnitude, any play in such joints results in wear causing an increase in the clearances between the components making up the joint.

This invention has as an object a steam turbine governor valve actuating mechanism embodying preloaded pivotal joints eliminating the objectionable condition above referred to.

SUMMARY OF THE INVENTION

One component of the pivotal joints, such as the rod ends connected to the valve operating rods, is formed with a cavity in which there is mounted a stack of Belleville spring washers. A hardened ball is positioned on the stack of washers and is yieldingly urged against the other member making up the joint, as the actuating arm. The motion transmitting members of the joint are pivotally connected by links attached by pins to the members. The spring washers and ball arrangment serves to place the links under tension by a pressure exceeding the unbalanced reaction forces of the governor valve, eliminating play in the pinned connections.

DESCRIPTION OF THE PREFERRED EMBODIMENT

Figure 1:
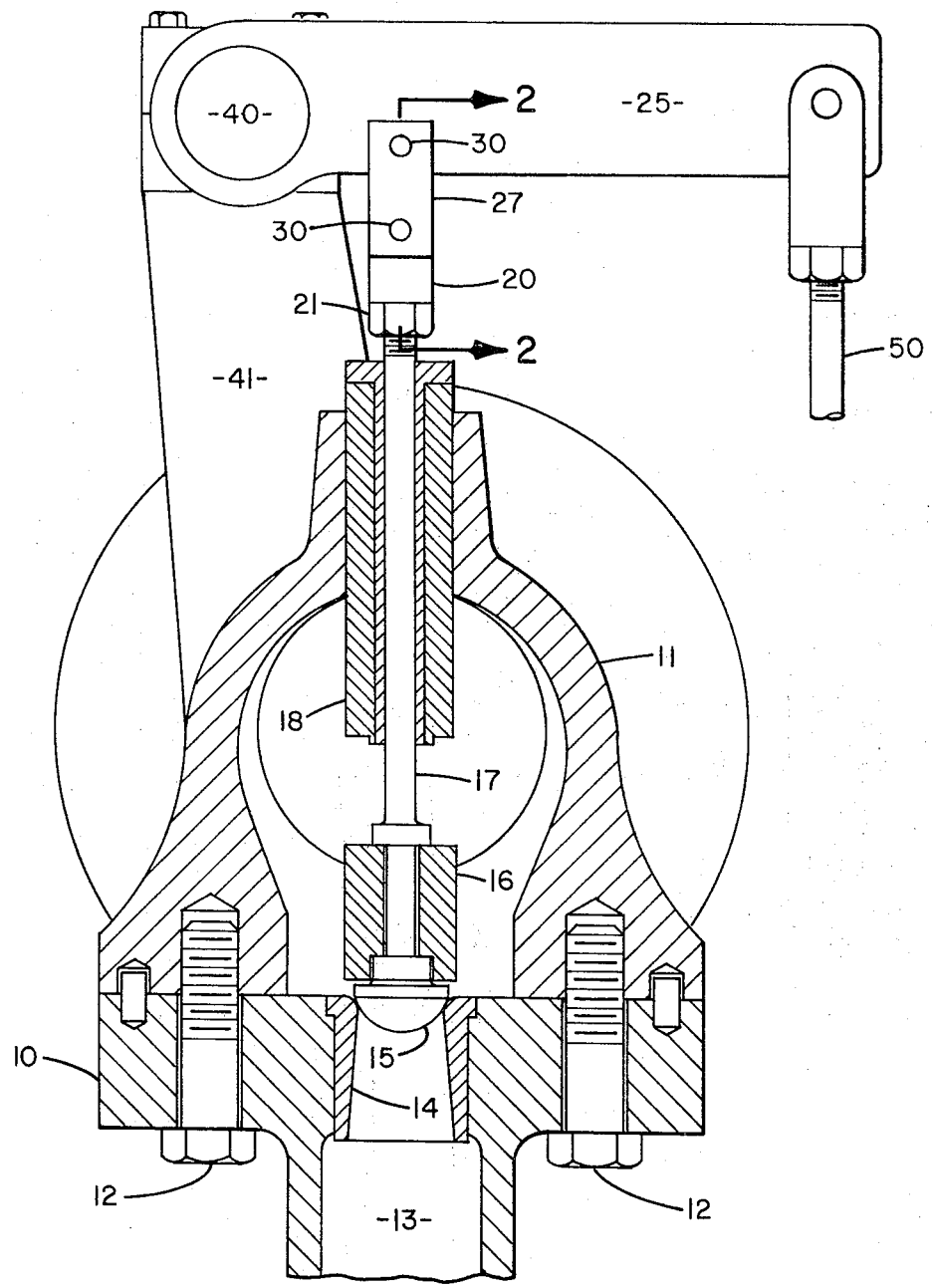
FIG. 1 is a vertical sectional view of a steam turbine valve chest and contiguous portion of the valve operating structure.

Referring to FIG. 1, the steam turbine casing is indicated at 10. A valve chest 11 is fixed to the casing as by screws 12. The portion of the casing forming the bottom wall of the valve chest is formed with a linear series of passages 13, each having a valve seat 14 mounted therein.

There is a valve 15 cooperable with each seat 14. The valves 15 are of the poppet type formed with stems operatively connected to a valve lifting bar 16. The valve lifting bar 16, and accordingly the valves 15, are moved in a direction axial of the valve seats 14 by actuating members, as lifting rods 17, which are slidably mounted in guide members 18 fixed in the top wall of the valve chest.

The upper ends of the lifting rods 17 have threaded connection with rod ends 20 and locked in adjusted position by lock nuts 21.

The rod ends 20 are pivotally connected to an operating arm 25 by links 27 overlying opposite sides of the rod ends 20 and the actuating arm 25. The rod ends 20 and the arm 25 are formed with transversely extending apertures to receive pivot pins 30. For further illustration of the valve operating structure, reference may be made to U.S. Pat. No. 3,625,541 issued Dec. 7, 1971.

The end surface of each of the rod ends 20 confronting the arm 25 is formed with a cavity 31, in which there is mounted a plurality of Belleville spring washers 33 arranged in a stack formation. The outermost washer 34 is positioned with the convex side thereof confronting the actuating arm member 25. A contact member, such as a hardened ball 35, is positioned on the stack of spring washers which function to yieldingly urge the ball against the confronting surface 37 of the arm 25 for rolling contact therewith.

Figure 2:
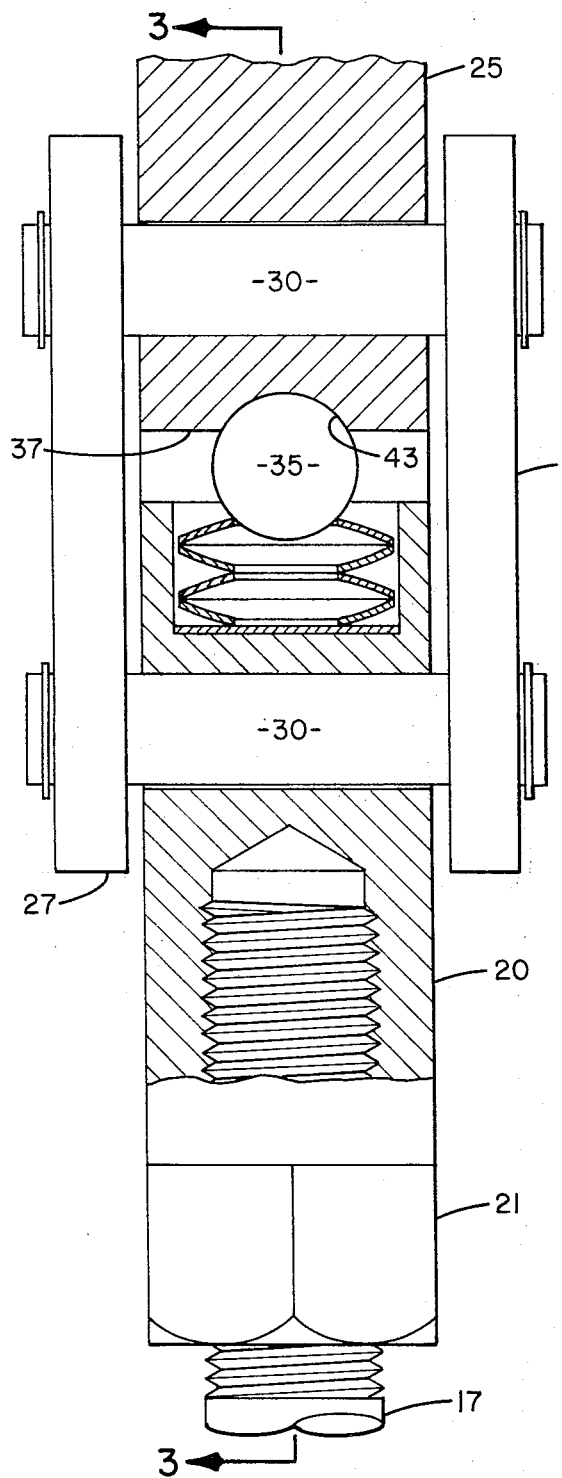
FIG. 2 is an enlarged view taken on line 2—2 FIG. 1.
Figure 3:
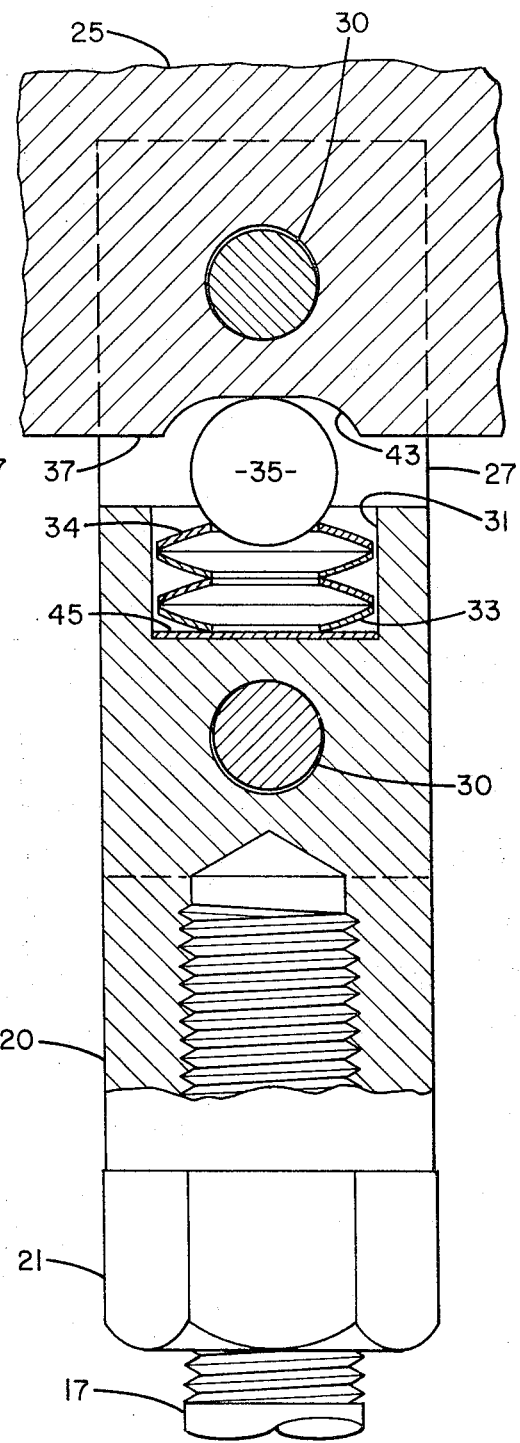
FIG. 3 is a view taken on line 3—3 FIG. 2.

The arm 25 is mounted on the shaft 40 for oscillation about the axis thereof. The shaft 40 is journaled in a supporting structure 41 attached to the turbine casing. The confronting surface 37 of arm 25 is formed with a recess 43 circular in cross section, see FIG. 2. The recess 43 is elongated in a direction lengthwise of the arm 25, see FIG. 3; that is, in a direction radial from the axis of the shaft 40. The recess 43 is formed on a radius comparable to the radius of the ball 35 and, in combination with the outermost washer 34, serves to maintain the ball in operative engagement with the arm 25.

The ball 35 provides the necessary rolling motion between the beam arm 25 and the rod end 20 during operation of the mechanism in moving the valves 15 toward and from the seats 14.

On assembly, a shim 45 is positioned in the bottom of the recess 31. The shim 45 is of a thickness to cause the washers 33, 34 to exert a force against the arm 25 greater than the governor valve reaction force. Accordingly, the side links 27 are maintained under tension, and the ends of the pins 30 are tightly engaged by the links and the intermediate portions of the pins 30 are tightly engaged against the upper side of the aperture in the rod end 20, and against the lower side of the aperture in the arm 25. This arrangement eliminates play in the joint structure and results in an improvement in the overall turbine governing system. A rod 50 is connected to the free end of the arm 25, and is reciprocated by a servo motor controlled by the turbine governor.

I claim:

1. A steam turbine governor valve actuating mechanism comprising a valve actuating member connected to the valve and movable in a linear path, an operating member movable in an arcuate path, said members having surfaces disposed in spaced confronting relation, connecting links pivotally attached to said members, one of said members being formed in the confronting surface thereof with a cavity, a plurality of Belleville spring washers in said cavity, a contact member positioned intermediate said stack and the confronting surface of said other member and having rolling engagement therewith, said spring washers yieldingly urging said contact member against said surface of said other member at a pressure exceeding the governor valve reaction forces to maintain said connecting links under tension.

2. A steam turbine governor valve actuating mechanism as set forth in claim 1, wherein said contact member is a ball of hardened material.

3. A steam turbine governor valve actuating mechanism as set forth in claim 1, wherein said cavity is formed in the confronting surface of said valve actuating member.

4. A steam turbine governor valve actuating mechanism as set forth in claim 1, wherein the confronting surface of said other member is formed with a recess dimensioned to receive said contact member for rolling engagement therewith.

5. A steam turbine governor valve actuating mechanism as set forth in claim 1, wherein the outermost washer in said stack is disposed with the convex side thereof facing said other member and said contact member consists of a ball positioned in said outermost member.

* * * * *